(12) United States Patent
Liu et al.

(10) Patent No.: US 6,270,046 B1
(45) Date of Patent: Aug. 7, 2001

(54) APPARATUS FOR MOUNTING A SWITCHING POWER SUPPLY IN A COMPUTER SYSTEM

(75) Inventors: Alvin Liu, Pa-Li; Yu-Tai Liu, Hsin-Chuang; Shao-Ming Fu, Pen-Chiao, all of (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 09/369,056

(22) Filed: Aug. 4, 1999

(30) Foreign Application Priority Data

Sep. 11, 1998 (TW) .................................................. 87215104

(51) Int. Cl.$^7$ ....................................................... A47F 5/08
(52) U.S. Cl. ......................... 248/231.9; 361/725; 248/694
(58) Field of Search ................................. 248/231.9, 694, 248/220.21, 220.1, 222.51, 224.8; 403/154, 155, 150; 361/725

(56) References Cited

U.S. PATENT DOCUMENTS

| | | | |
|---|---|---|---|
| 5,032,952 | * 7/1991 | Cooke et al. | 361/747 |
| 5,172,305 | * 12/1992 | DeWilde | 361/769 |
| 5,777,848 | * 7/1998 | McAnally et al. | 361/725 |
| 5,992,955 | * 11/1999 | Yang | 312/265.6 |

* cited by examiner

*Primary Examiner*—Anita M. King
*Assistant Examiner*—Holly N. Sy
(74) *Attorney, Agent, or Firm*—Wei Te Chung (57) ABSTRACT

A computer system includes a chassis which is formed by assembling front, rear and bottom panels together. An apparatus for mounting a switching power supply to the computer system includes a drive cage bridging between the front and rear panels and forming a pair of hooks, a bracket including a hinge portion and a supporting portion adapted to support the switching power supply. The hinge portion of the bracket is slidably engaged with the hooks for fixing the switching power supply to the rear panel of the chassis.

9 Claims, 11 Drawing Sheets

APPARATUS FOR MOUNTING A SWITCHING POWER SUPPLY IN A COMPUTER SYSTEM

BACKGROUND OF THE INVENTION

1. Field of the Invention

The present invention relates to an apparatus for mounting a switching power supply in a computer system, and particularly to a bracket pivotably mounting and fixing a switching power supply in a computer chassis of a computer system.

2. The Related Art

Computer systems, such as personal computers and computer servers, use switching power supplies to transform the voltage value of local electrical power to an operational voltage. For instance, local electrical power generally is an alternating current with a voltage value between 100 and 250 Volts. The electrical power used in a computer system is a direct current with a voltage usually under 12 Volts. Therefore, the local electrical power can not be directly used in the computer system. A switching power supply transforms the local electrical power and provides the computer system with a proper operational voltage.

Figure 1:
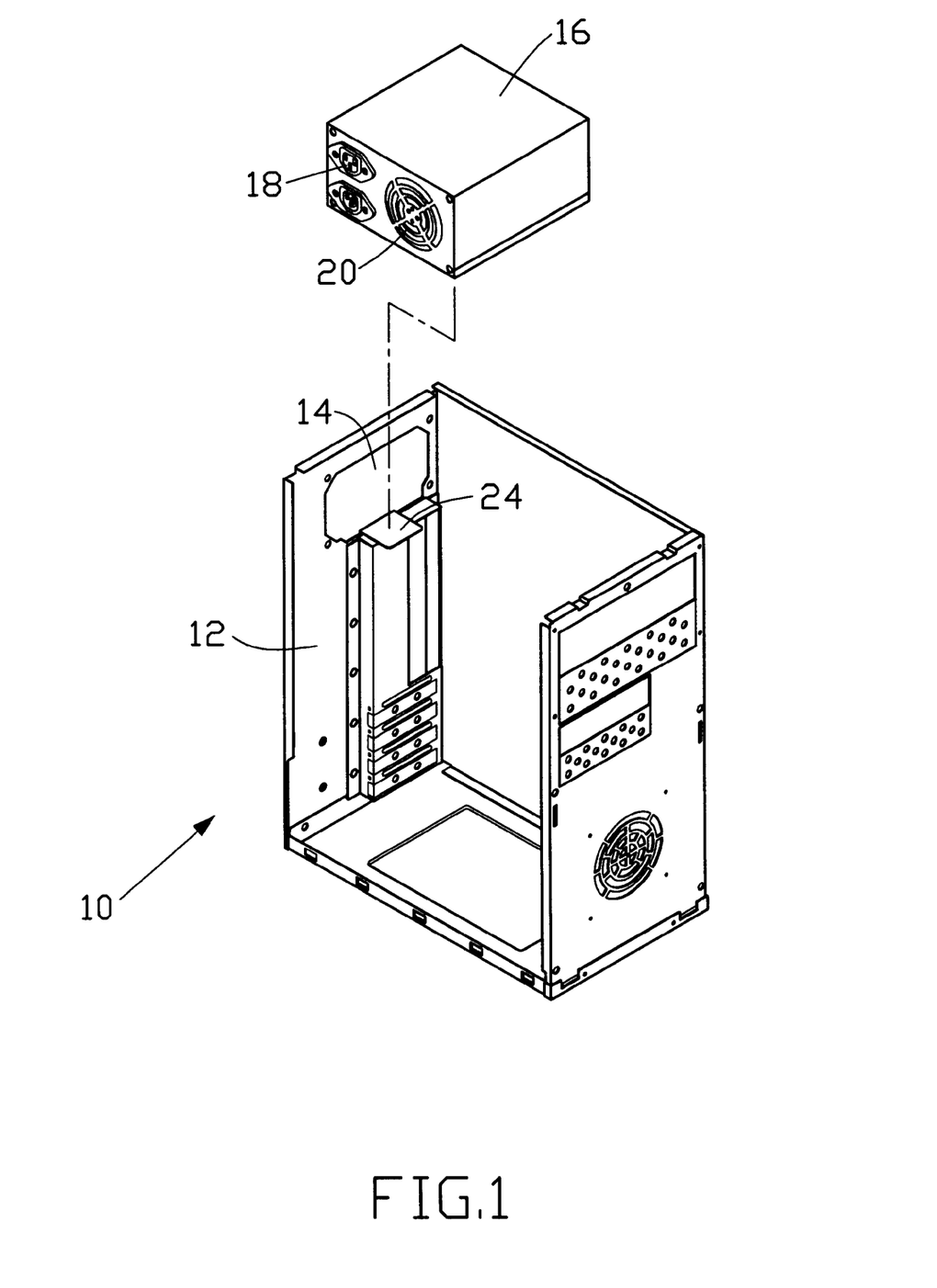
FIG. 1 is a perspective view of a switching power supply to be mounted to a conventional computer enclosure.

Referring to FIG. 1, a conventional personal computer enclosure 10 has a rear panel 12 forming an opening 14 in an upper portion thereof for mounting a switching power supply 16. An electrical socket 18 and venting holes 20 of the switching power supply 16 are exposed to an exterior of the enclosure 10. During assembly of a computer system, technicians must maintain the switching power supply 16 on a stage 24 with one hand and use the other hand to operate a tool to screw the switching power supply 16 to the enclosure 10. This complex job requires complete concentration of a trained technician and impedes production speed.

In addition, the switching power supply distributes electrical power to sub systems of the computer requiring different voltage levels, such as a CD-ROM drive, a floppy disk drive, a hard disk drive and a fan. Thus, electrical wires and cables connecting the sub systems to the switch power supply become easily entangled. When a computer system requires upgrading, repair or maintenance the entangled cables and wires hinder access to the motherboard.

As computers develop, computer size is decreasing. Some small tower-shaped computers position the switching power supply proximate a side portion of the enclosure thereof for reducing the volume of the computer. Therefore, the switching power supply faces the motherboard. The switching power supply becomes more of an obstacle within the computer system than the entangled cables and wires and completely blocks access to the motherboard.

To overcome the above-mentioned problems, an improved enclosure is required to provide a more convenient structure for mounting a switching power supply.

SUMMARY OF THE INVENTION

An object of the present invention is to provide an apparatus for easily mounting a switching power supply to a computer supply.

Another object of the present invention is to provide a computer enclosure having a pivotally attached bracket for mounting a switching power supply to facilitate computer system repair, maintenance and upgrade.

A further object of the present invention is to provide a computer enclosure having a pivotally attached bracket for facilitating the mounting of a switching power supply to the enclosure and expediting assembly of the computer system.

The present invention discloses an apparatus for mounting a switching power supply to a computer system. The computer system includes a chassis which is formed by assembling front, rear and bottom panels together. The apparatus includes a drive cage bridging between the front and rear panels and forming a pair of hooks, a bracket including a hinge portion and a supporting portion adapted to support the switching power supply. The hinge portion of the bracket is slidably engaged with the hooks for fixing the switching power supply to the rear panel of the chassis.

DETAIL DESCRIPTION OF THE PREFERRED EMBODIMENTS

References will now be made in detail to the preferred embodiments of the present invention.

Figure 2:
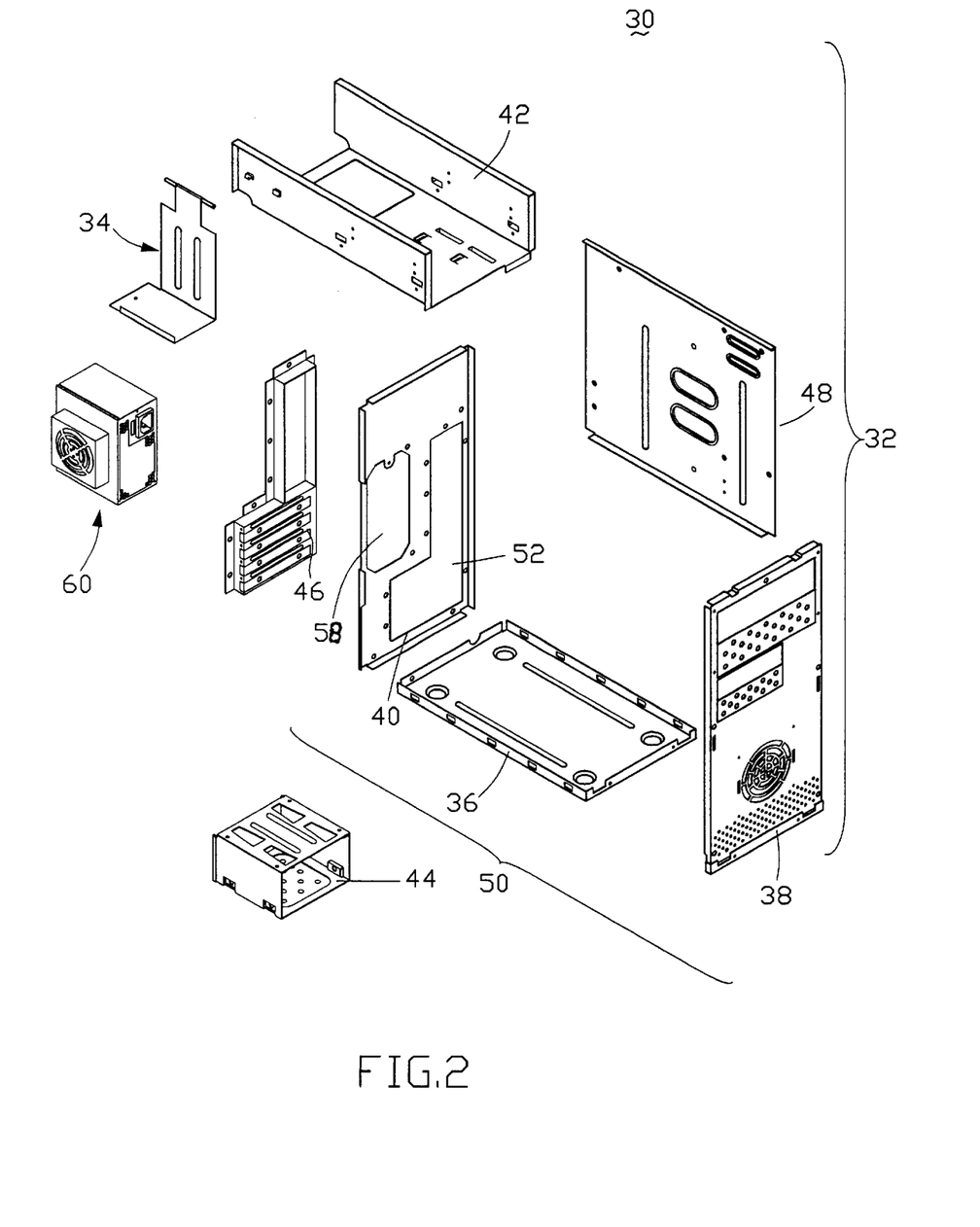
FIG. 2 is exploded view of a computer enclosure in accordance with the present invention.

Referring to FIG. 2, a computer housing 30 includes an enclosure 32 and a bracket 34 for mounting a switching power supply 60. The enclosure 32 comprises a base panel 36, a front panel 38, a rear panel 40, a drive cage 42, a drive box 44, an I/O bracket 46 and a motherboard support 48. The base panel 36, the front panel 38 and the rear panel 40 are assembled together to form a chassis 50. The drive cage 42 is U-shaped and mounted between the front panel 38 and the rear panel 40 for bridging an upper portion of the chassis 50 and reinforcing the structure thereof. The drive cage 42 mounts a CD-ROM or a hard disk in a front portion thereof. The drive box 44 is attached to a bottom surface of the front portion of the drive cage 42 for mounting a floppy disk drive or built-in hard disk (not shown) therein. The rear panel 40 defines an L-shaped opening 52 for mounting the I/O bracket 46 and an opening 58 for mounting the switching power supply 60. The bracket 34 is pivotally attached to a rear portion of the drive cage 42 for supporting and fixing the switching power supply 60 to the chassis 50.

Figure 3:
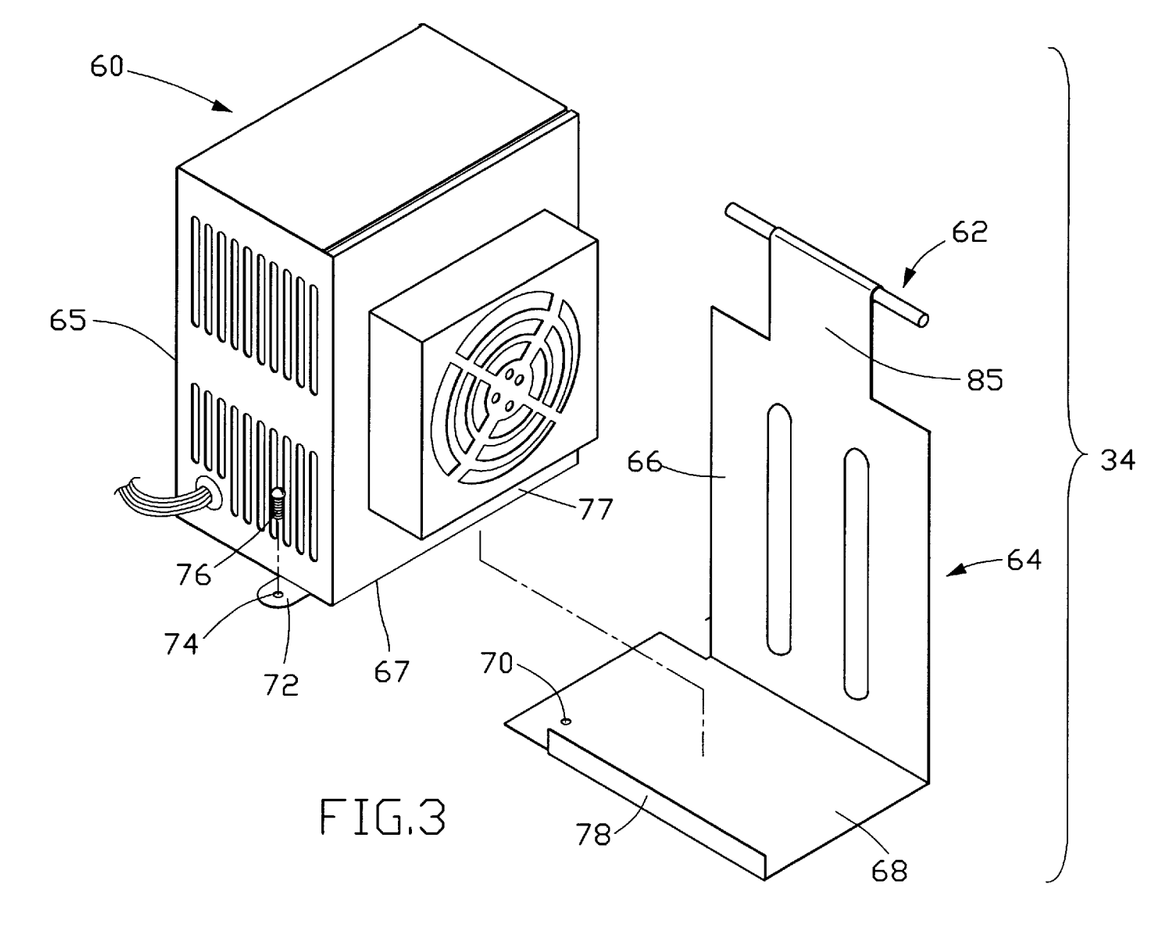
FIG. 3 is a perspective view of a switching power supply and a mounting bracket of the computer enclosure.
Figure 4:
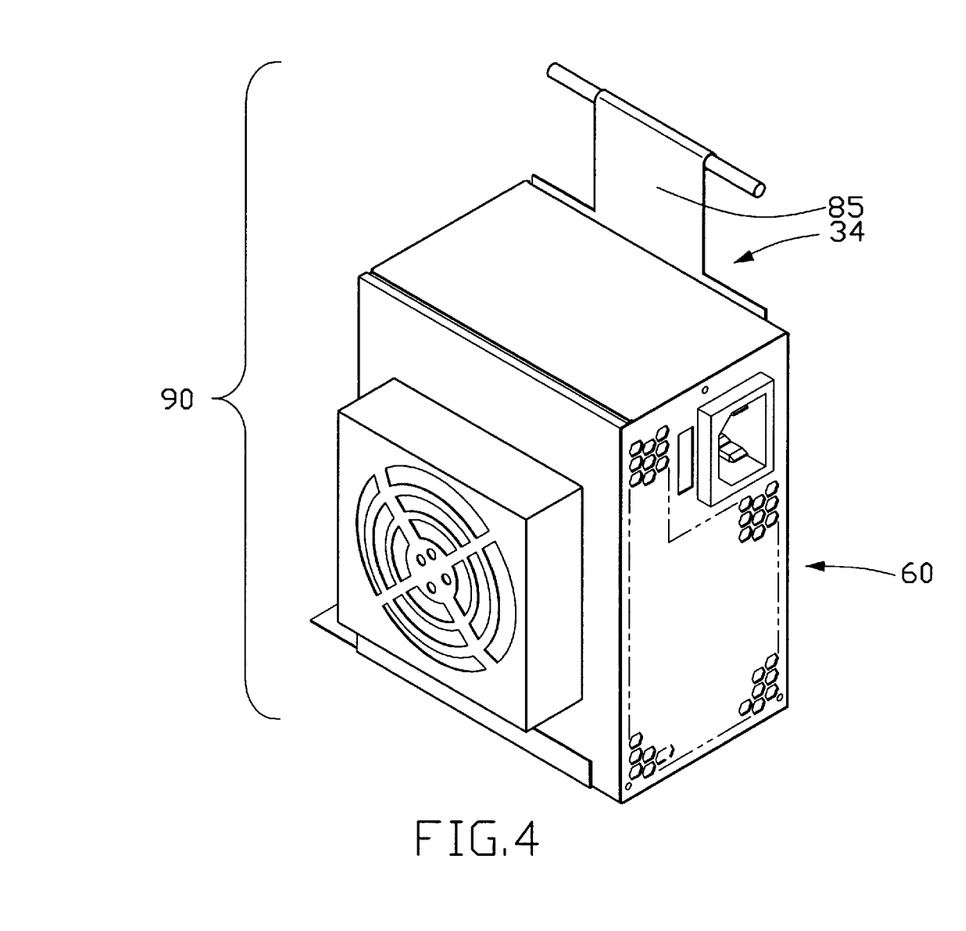
FIG. 4 is a perspective, assembled view of the switching power supply and the mounting bracket of FIG. 3 together forming a power supply assembly.

Referring to FIGS. 3 and 4, the bracket 34 includes a hinge portion 62 and a supporting portion 64. The hinge portion 62 is pivotally attached to the enclosure 32 (not shown in FIGS. 3 and 4). The supporting portion 64 supports the switching power supply 60 and includes a vertical portion 66 and a horizontal portion 68 for abutting against corresponding side faces 65, 67 of the switching power supply 60. A connecting plate 85 connects the vertical portion 66 and the hinge portion 62. The horizontal portion 68 defines a hole 70 for aligning with a hole 74 defined in a tab 72 of the switching power supply 60. A screw 76 extending through aligned holes 70, 74 secures the switching power supply 60 to the supporting portion 64 of the bracket 34. The horizontal portion 68 forms a flange 78 along a longitudinal side opposite the vertical portion 66 for abutting against a side face 77 of the switching power supply 60. Therefore, the switching power supply 60 is positioned in the bracket 34 to form a power supply assembly 90.

Figure 5:
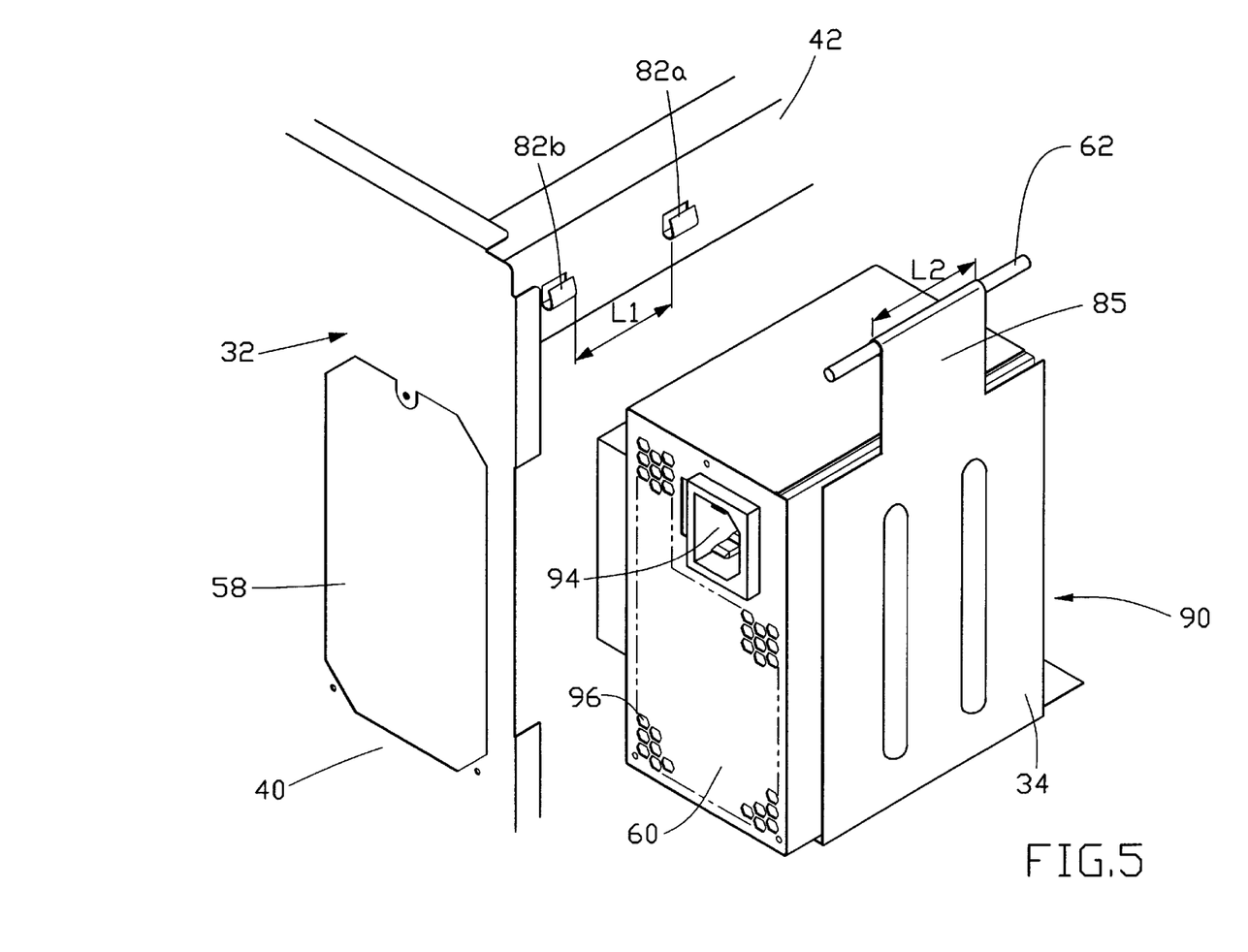
FIG. 5 is a perspective view showing a portion of the computer enclosure and the power supply assembly to be mounted thereto.

As shown in FIG. 5, a side wall of the drive cage 42 forms a pair of hooks 82a, 82b on a rear portion thereof. The hooks 82a, 82b support the hinge portion 62 of the bracket 34 to pivotally mount the power supply assembly 90 thereto. The distance L1 between the hooks 82a, 82b is larger than the width L2 of the connecting plate 85 of the bracket 34. Therefore, the connecting plate 85 can slide between the hooks 82a, 82b when the power supply assembly 90 is pivotally attached to the drive cage 42.

Figure 6:
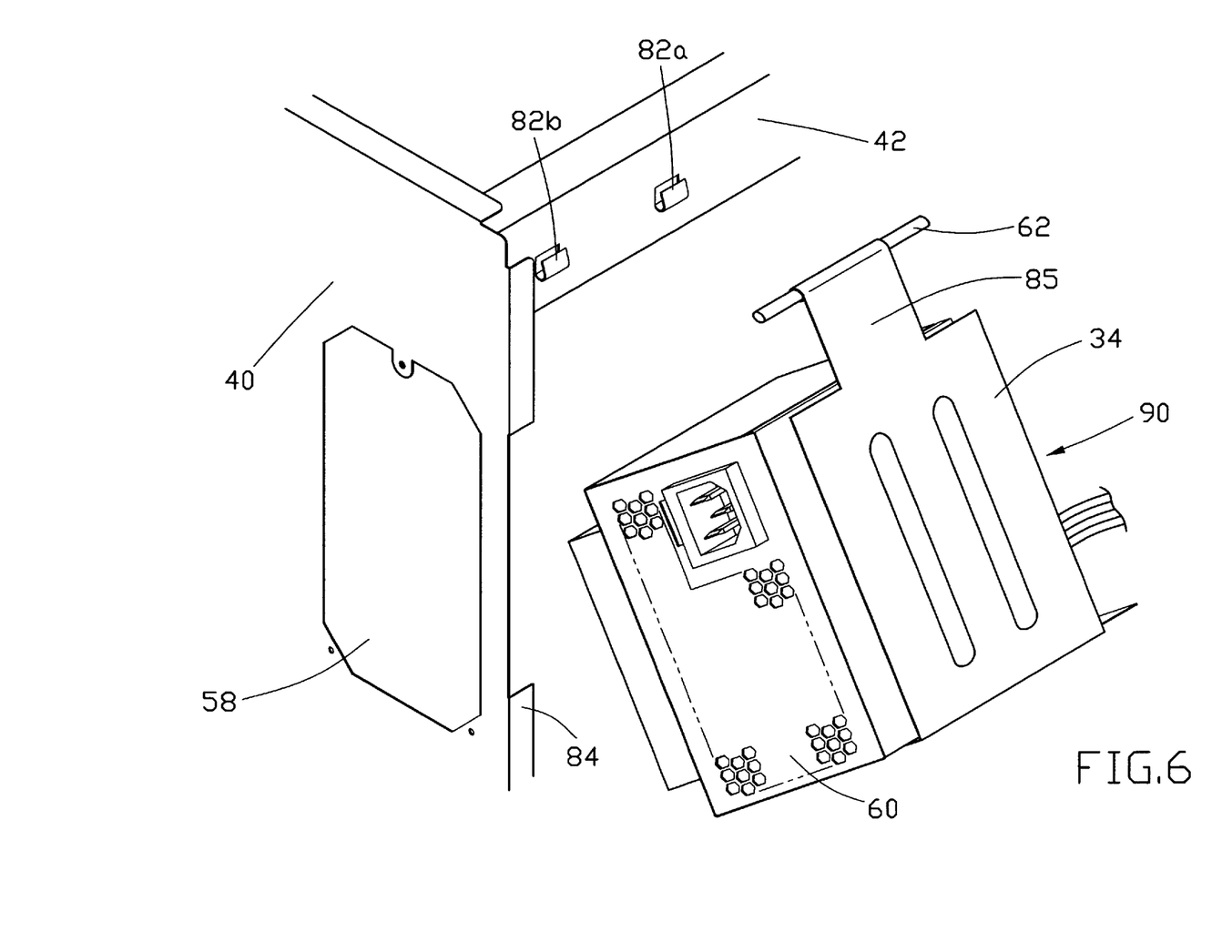
FIG. 6 is similar to FIG. 5 with the power supply assembly being rotated at an angle.
Figure 7:
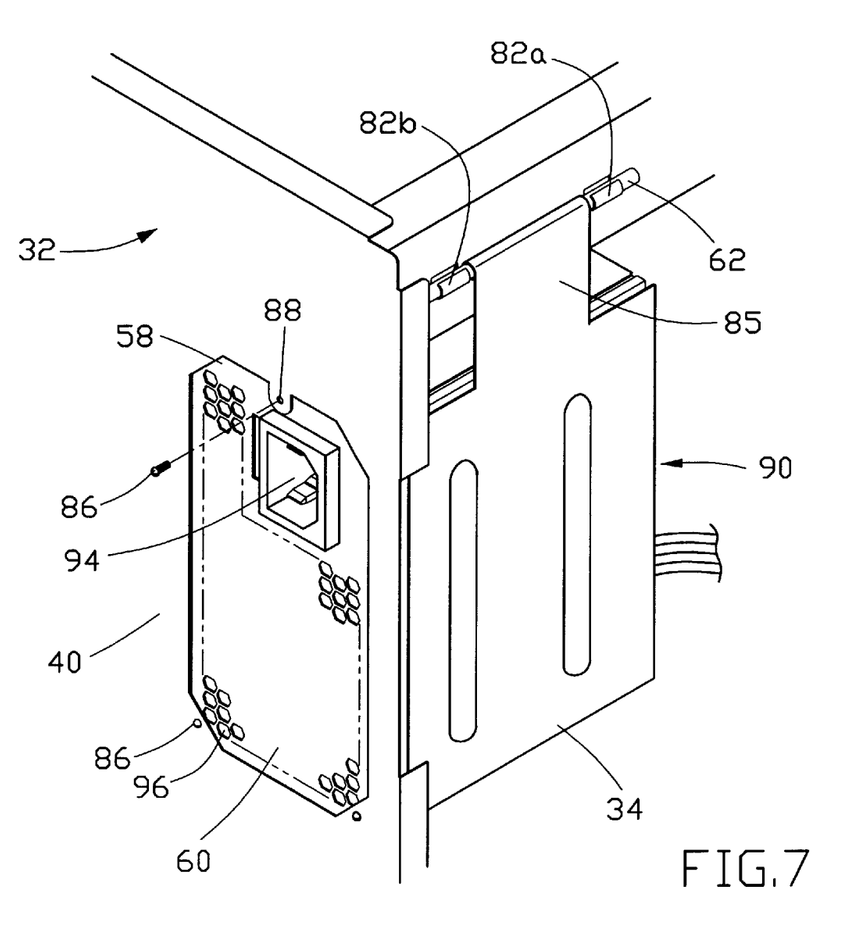
FIG. 7 is a perspective view of the power supply assembly mounted to the computer enclosure.

As shown in FIG. 6, the power supply assembly 90 is rotated a predetermined angle for engaging the hinge portion 62 with the hooks 82a, 82b. The connecting plate 85 of the bracket 34 is closer to the hook 82a than the hook 82b to prevent the power supply 60 from contacting a bent portion 84 of the rear panel 40. Referring to FIG. 7, the power supply assembly 90 is mounted to the enclosure 32. The hinge portion 62 is positioned in the hooks 82a, 82b and the connecting plate 85 abuts against the hook 82b whereby the power supply 60 abuts against the rear panel 40. Therefore, a power socket 94 and venting holes 96 of the power supply 60 are exposed to an exterior of the enclosure 32 through the opening 58. Screws 86 extend through holes 88 of the rear panel 40 for fixing the switching power supply 60 to the enclosure 32.

Figure 8:
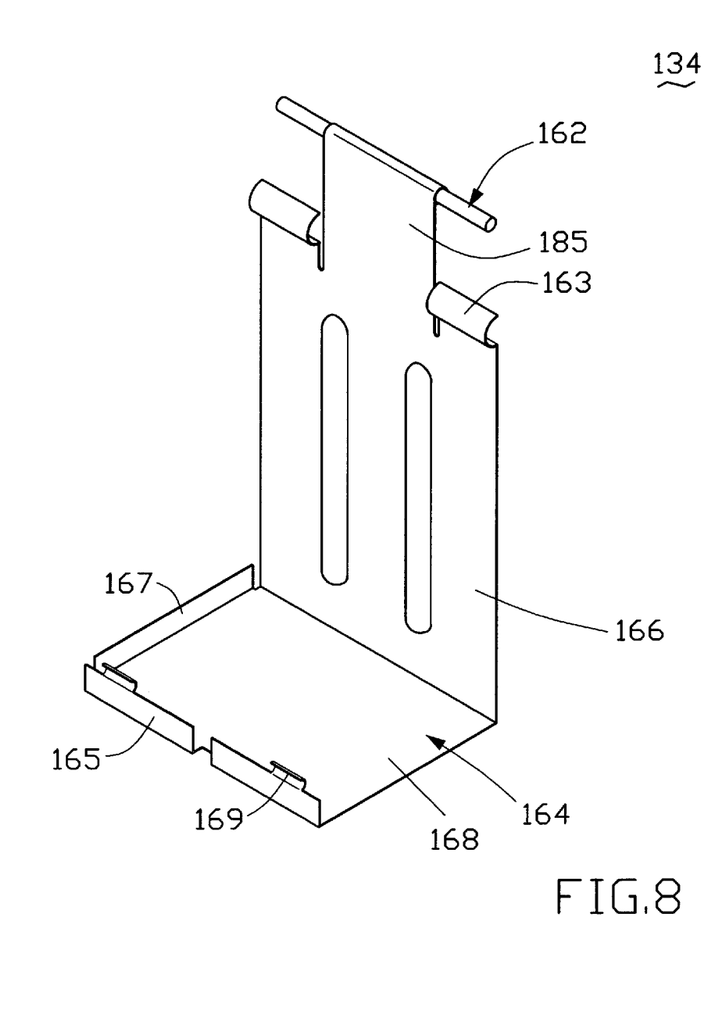
FIG. 8 is a perspective view of a mounting bracket in accordance with a second embodiment of the present invention.

FIG. 8 shows a second embodiment of a bracket 134. The bracket 134 includes a hinge portion 162 and a supporting portion 164. The supporting portion 164 supports a switching power supply 160 (FIG. 9) and further includes a vertical portion 166 and a horizontal portion 168. The vertical portion 166 forms a connecting plate 185 for connecting to the hinge portion 162 and arcuate portions 163. The horizontal portion 168 forms a longitudinal flange 165 opposite the vertical portion 166 and a lateral flange 167. The longitudinal flange 165 further forms a pair of arcuate portions 169.

Figure 9:
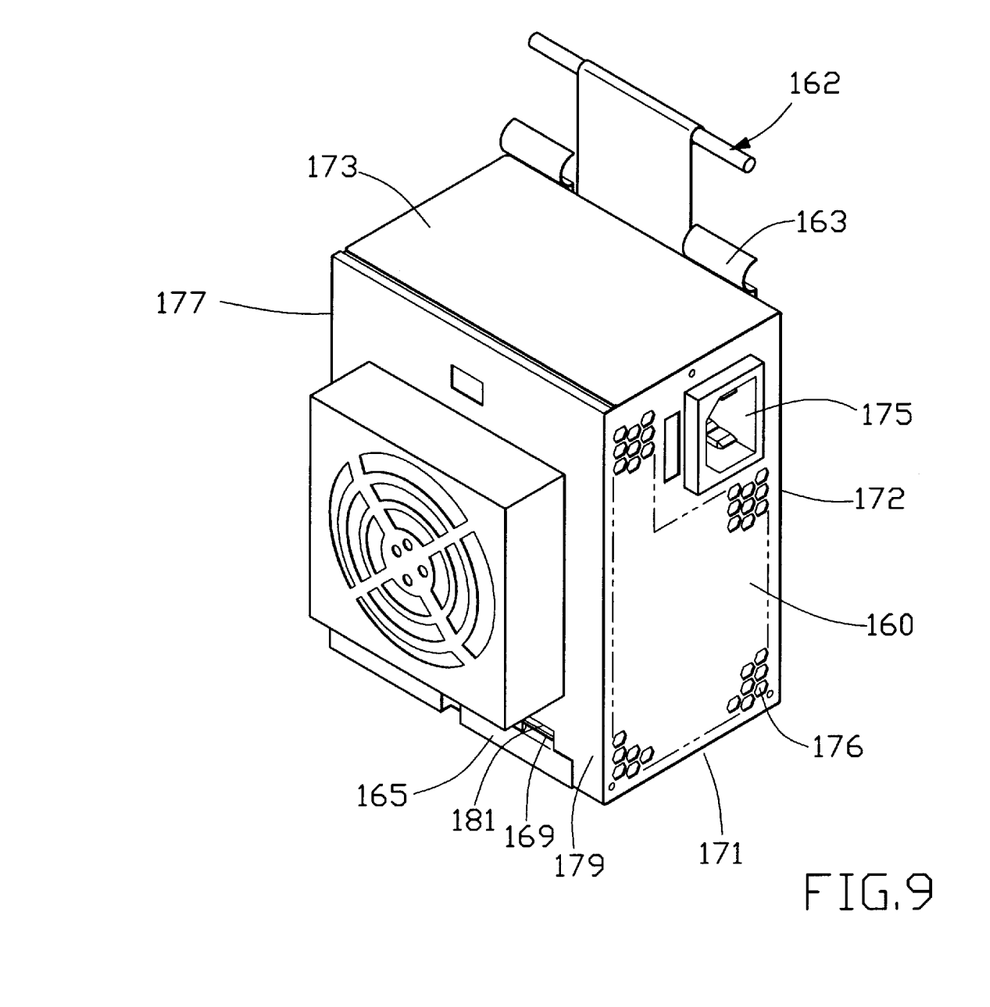
FIG. 9 is a perspective view of a switching power supply mounted to the mounting bracket of FIG. 8 to form a power supply assembly.

Referring to FIG. 9, the vertical portion 166 and the horizontal portion 168 of the bracket 134 abut a bottom face 171 and a side face 172 of the power supply 160, respectively. The arcuate portions 163 of the vertical portion 166 engage a top face 173 of the power supply 160 for limiting vertical movement of the power supply 160. The arcuate portions 169 engage recesses 181 defined in an opposite side face 179 of the power supply 160 for limiting lateral movement of the power supply 160. The flange 167 abuts a face 177 for stopping the power supply 160 when the power supply 160 is fixed to the enclosure.

Figure 10:
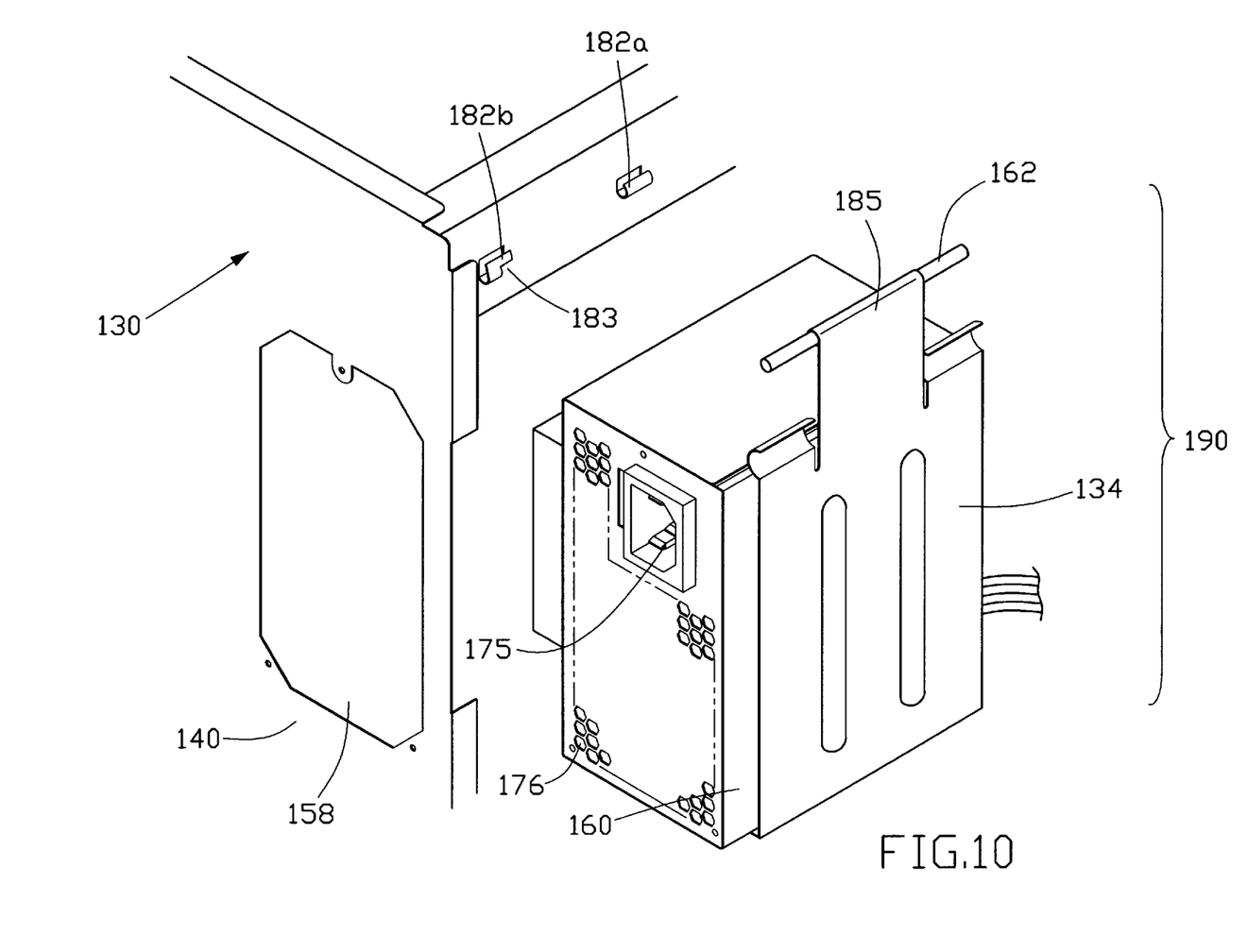
FIG. 10 is perspective view showing a portion of the computer enclosure and the power supply assembly of FIG. 9 to be mounted thereto.
Figure 11:
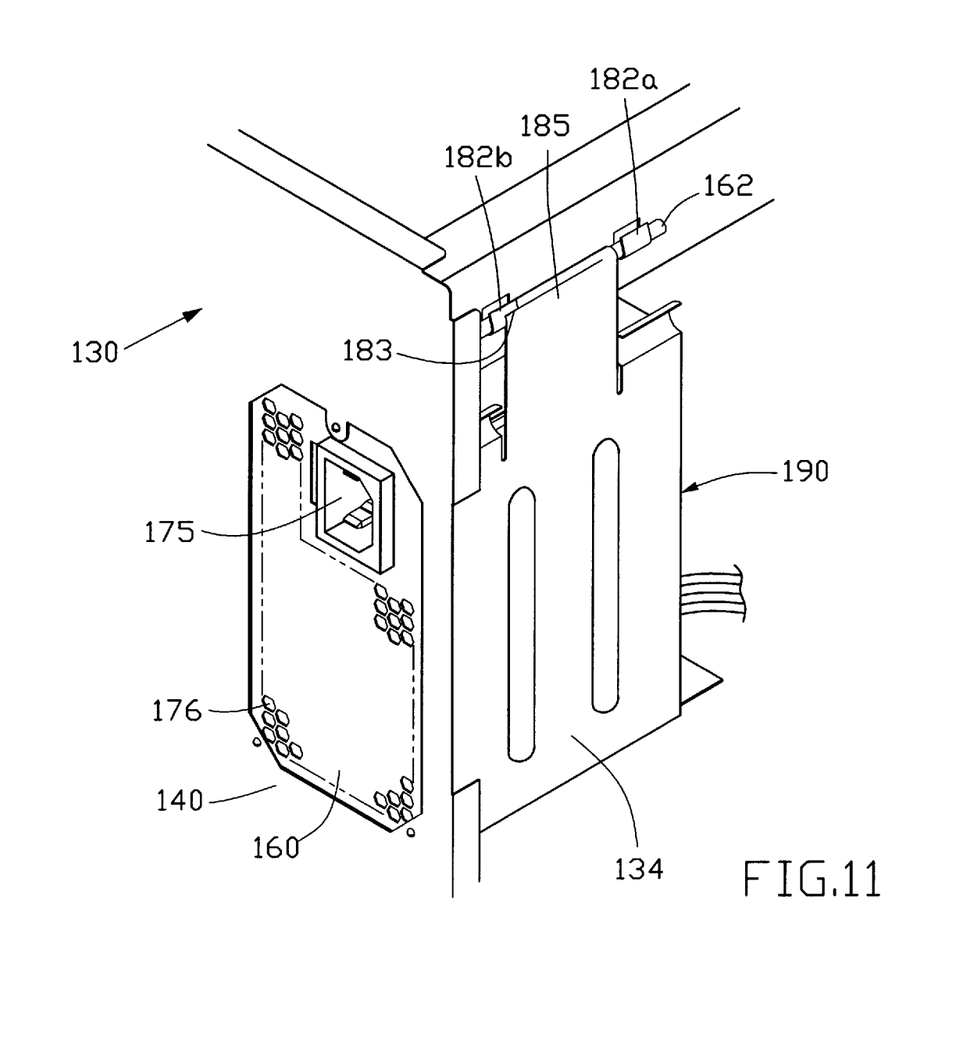
FIG. 11 is a perspective, assembled view of FIG. 10.

Referring to FIGS. 10 and 11, the power supply 160 is mounted to the bracket 134 to form a power supply assembly 190. As in the first embodiment described above, the hinge portion 162 of the bracket 134 engages with hooks 182a, 182b and the connecting plate 185 is located closer to the hook 182a. The hook 182b further defines a notch 183 for engaging a left portion of the connecting plate 185 and preventing the power assembly 190 from pivoting when the bracket 134 slides to the left of the enclosure 130. The power supply 160 is fixed to a rear panel 140 and a power socket 175 and venting holes 176 of the power supply 160 are exposed to an exterior of the enclosure 130 through the opening 158 of the rear panel 140.

While the present invention has been described in reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, persons of ordinary skill in this field are to understand that all such equivalent structures are to be included within the scope of the following claims.

We claim:

1. An apparatus for mounting a switching power supply to a computer system including front, rear and bottom panels forming a chassis, comprising:

a drive cage adapted for bridging between the front and rear panels and forming a pair of hooks on a side wall thereof; and a bracket including a hinge portion and a supporting portion perpendicular to the hinge portion and adapted to support the switching power supply;

wherein the hinge portion of the bracket is slidably engaged with the hooks to position the supporting portion under the drive cage.

2. The apparatus as described in claim 1, wherein the supporting portion of the bracket includes a vertical portion and a horizontal portion for abutting corresponding faces of the switching power supply.

3. The apparatus as described in claim 2, wherein the vertical portion includes a connecting plate connecting to the hinge portion.

4. The apparatus as described in claim 3, wherein the width of the connecting plate is smaller than the distance between the hooks.

5. The apparatus as described in claim 3, wherein one of the hooks has a notch for engaging with the connecting plate of the bracket.

6. The apparatus as described in claim 2, wherein the vertical portion further forms an arcuate portion adapted for retaining the switching power supply.

7. The apparatus as described in claim 2, wherein the horizontal portion forms an arcuate portion for retaining the switching power supply.

8. The apparatus as described in claim 2, wherein the horizontal portion defines a hole for receiving a screw to secure the switching power supply to the bracket.

9. A computer, comprising:

a computer enclosure including at least a front panel and an opposite rear panel defining an opening;

a drive cage bridging between said front and rear panels and fastened to the computer enclosure, the drive cage forming a pair of hooks on a side wall thereof;

a bracket defining a hinge portion and a supporting portion; and a power supply seated on and fastened to said supporting portion; wherein the hinge portion of the bracket is slidably engaged with the hooks to situate the supporting portion under the drive cage for exposing power sockets of the power supply to an exterior through said opening of the rear panel.

* * * * *